(No Model.)

A. T. HUTSON.
Shaft and Tumbling Rod Coupling.

No. 229,043. Patented June 22, 1880.

Witnesses.
Anton Ruppert,
D. P. Cowl

A. T. Hutson
Inventor.
D. P. Holloway
Atty

UNITED STATES PATENT OFFICE.

ALLEN T. HUTSON, OF NAPERVILLE, ASSIGNOR OF ONE-HALF OF HIS RIGHT TO ABNER ROYCE, OF DUPAGE, ILLINOIS.

SHAFT AND TUMBLING-ROD COUPLING.

SPECIFICATION forming part of Letters Patent No. 229,043, dated June 22, 1880.

Application filed May 11, 1880. (No model.)

*To all whom it may concern:*

Be it known that I, ALLEN T. HUTSON, a citizen of the United States, residing at Naperville, in the county of Du Page and State of Illinois, have invented certain new and useful Improvements in Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in shaft and tumbling-rod couplings, in which provision is made for making the parts rigid or flexible, as circumstances may require; and the objects of my improvements are to provide a flexible coupling for lines of shafting, tumbling-rods, drill-rods, and for attaching thills to wagons and other road-carriages, which may be flexible or yielding, so as to allow it to conform to the different positions of the device to which it is attached, or rigid when the parts are in line with each other, and to remain so. I attain these objects by the mechanism illustrated in the accompanying drawings, in which—

Figure 1:
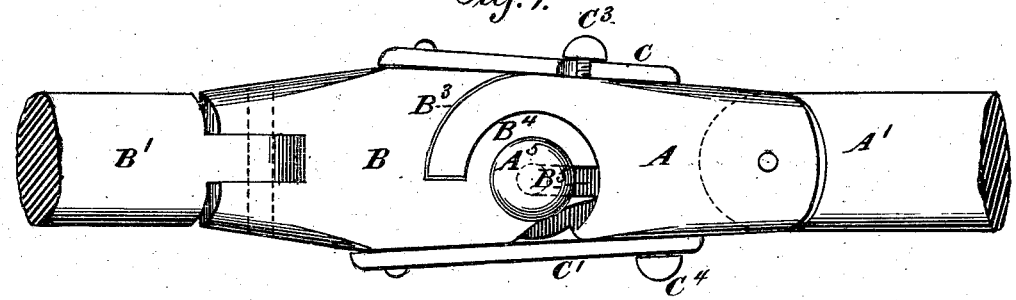
Figure 2:
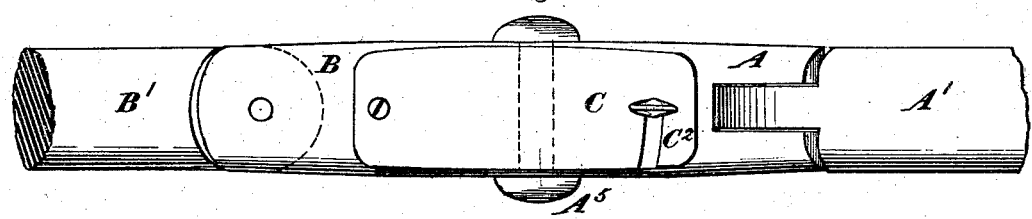
Figure 3:
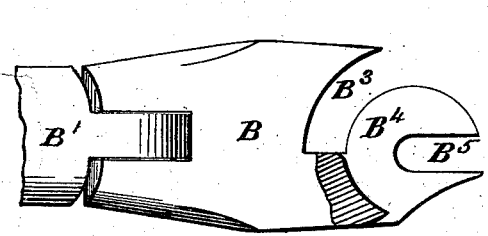
Figure 4:
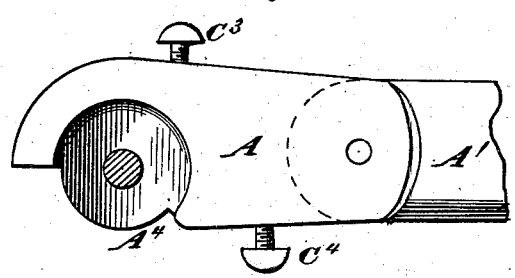
Figure 5:
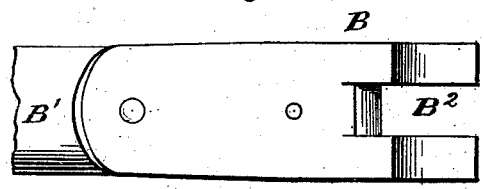
Figure 6:
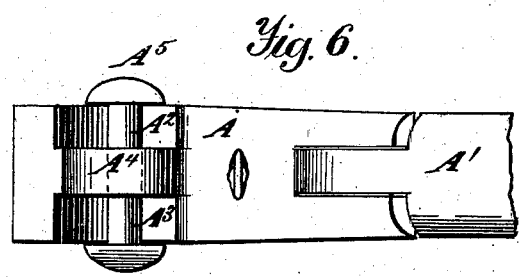

Figure 1 is a side elevation, showing the parts in position for causing the coupling or shaft to be rigid in its central joint, the plates for such purpose being shown as locked in the proper positions. Fig. 2 is a plan view of the same, showing also the different positions of the joints by which a pump-rod or shaft may be attached to the coupling. Fig. 3 is a side elevation of one section, showing its construction and a part of one portion of the attached rod or shaft. Fig. 4 is a side elevation of the other section of the coupling, showing its construction and the bolts which secure thereto the plates for rigidly securing the two sections to each other. Fig. 5 is a plan view of the part shown in Fig. 3, and Fig. 6 of the part shown in Fig. 4.

Similar letters refer to similar parts throughout the several views.

In constructing couplings of this type I provide a section, A, of the general contour shown in the drawings, or any other that will adapt it to the purpose for which it is designed. To the outer end of this section there is pivoted a rod or shaft, A', which, when the parts are in the positions shown in Fig. 1, is free to have its outer end moved vertically, but when in the position shown in Fig. 2 it will move horizontally, and will thus be made to permit of the use of the coupling upon tumbling-rods or shafts which are not in line with each other, the opposite section, B, of the coupling being provided with a similarly-jointed rod or shaft, B', the joint of which is so arranged that at any particular period of time the rod or shaft shall vary from a line with the coupling in a direction opposite to that coupled to the section A.

The outer ends of both of the above-named sections of the couplings are bifurcated, as shown, and the ends of the rods or shafts are reduced, so as to allow them to enter the slots in said sections and to be held therein by a bolt or pin, upon which said rods are free to turn sufficiently to cause them to accommodate themselves to the angularities of the general line of the device.

The inner end of section A of the coupling is provided with two recesses, $A^2$ $A^3$, one upon each of its sides, the walls of which constitute a segment of a circle, the extreme inner portions of which walls extend into recesses formed in section B and partly encircle a projection formed thereon, as shown clearly in Fig. 1. Between the recesses just alluded to there is a projection, $A^4$, which enters a slot or recess, $B^2$, in section B. In the projection $A^4$ there is affixed a pin or bolt, $A^5$, it being provided with heads or flanges upon its outer ends, of considerable diameter, for the purpose of preventing the injurious side strain upon the jaws of section B.

By preference the bolt or pin $A^5$ is firmly secured in projection $A^4$, so that it will not turn as the section B moves upon it; but it may be so loose as to turn, if desired.

The inner end of section B of this coupling is to be substantially of the form shown in Figs. 1 and 3, it having the same general exterior contour as that of section A, but is provided with a curved recess, $B^3$, for the reception of the curved wall of section A, as shown in Fig. 1. This section B is also provided with projections $B^4$, the upper surfaces of which are of the same circle as the inner surface of the wall of section A, and have in their extreme inner surfaces slots $B^5$, which are of sufficient width and length to admit of their being passed over or upon the bolt or pin $A^5$ in the recesses $A^2$ and $A^3$ of section A.

The center of the circle from which the curvature of the wall of the recesses in section A and the recess $B^3$ in section B, as well as the outer or rounded surface of projection $B^4$, is described is at the center of bolt or pin $A^5$, and hence when the parts are formed as described and put together they fit each other, and thus prevent any lengthening or shortening of the coupling at that point, and at the same time prevent the strain that would otherwise be put upon the coupling-pin, while, as a consequence of such construction and arrangement of the parts, provision is made for placing the sections at considerable angles to each other, for the purpose of changing, when necessary, the directions of the two portions $A'$ and $B'$ of the shaft or rod in which the coupling may be placed.

This device, as already described, is applicable to lines of shafting for driving machinery of various kinds, and especially for what are termed "tumbling-shafts" for driving thrashing-machines, saws for cutting off logs, attaching thills to carriages, and for various other purposes, it affording a ready means for coupling and uncoupling such shafts or rods; but it is also well adapted for use in coupling together the sections of rods used in drilling rocks or other substances and in boring wells, it being only necessary in the last-named cases to provide some means for making the coupling rigid at the point of connection; and to accomplish this there are provided two plates of metal, C C', which are bolted or pivoted to one of the sections, but so as to turn freely thereon. These plates are of such length as to cause them to extend from the part to which they are secured to and upon the other section, and are each provided with a slot, $C^2$, in one of their edges, so that by turning them into the positions shown in Fig. 1 they will embrace bolts $C^3$ and $C^4$, which are screwed into the section which is opposite to the one to which the plates are pivoted. These bolts are provided with an elongated head for convenience in turning. When it is desirable to cause the coupling to be rigid at this point the plates C C' are, as before stated, placed in the positions shown in Fig. 1, and the bolts $C^3$ and $C^4$ turned so as to cause their heads to press the plates firmly against the surface of the sections, when the required rigidity will be produced; but upon loosening the screws and swinging the plates back upon the part to which they are secured the parts of the coupling can be easily separated.

Having thus described my invention, what I claim, and desire to secure by Letters Patent, is—

1. The section A of a coupling for shafts, tumbling-rods, and for other purposes, having in its inner end circular recesses, and a curved wall for extending into a curved recess in the section to which it is coupled, for the purpose of relieving the coupling bolt or pin from strain, and for allowing said section to work at an angle to a line drawn through its center in the direction of its length.

2. The section B of a coupling for shafts, tumbling-rods, and for other purposes, the inner end of which is provided with a curved recess for the reception of a portion of the wall of the opposite section and with a curved projection having in it a slot for embracing the coupling bolt or pin, substantially as set forth.

3. A coupling for shafts, tumbling-rods, and for other purposes, consisting of two sections, A and B, each having interlocking surfaces or segments of circles described from a common center, whereby the parts are held in contact with each other, and undue strain is prevented upon the bolt or pin which unites them, substantially as described.

4. The combination of the sections A and B of a shaft and tumbling-rod coupling, the bolt or pin $A^5$, for uniting the parts, the shafts or rods $A'$ $B'$, and the plates C C', and screws or bolts $C^3$ and $C^4$, the parts being constructed and arranged for joint operation substantially as set forth.

In testimony whereof I affix my signature in presence of two witnesses.

ALLEN T. HUTSON.

Witnesses:
 H. H. GOODRICH,
 SAMUEL W. SMITH.